United States Patent
Chien et al.

(10) Patent No.: US 10,411,808 B2
(45) Date of Patent: Sep. 10, 2019

(54) PROBABILISTICALLY SHAPED MULTI-LEVEL PULSE MODULATION WITH GRAY CODE MAPPING

(71) Applicant: ZTE Corporation, Shenzhen (CN)

(72) Inventors: Hung-Chang Chien, Bridgewater, NJ (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/863,816

(22) Filed: Jan. 5, 2018

(65) Prior Publication Data

US 2019/0215077 A1    Jul. 11, 2019

(51) Int. Cl.
| | | |
|---|---|---|
| *H04B 10/516* | (2013.01) | |
| *H04L 25/49* | (2006.01) | |
| *H04L 27/36* | (2006.01) | |
| *H04L 25/03* | (2006.01) | |
| *H04B 10/556* | (2013.01) | |
| *H04B 10/54* | (2013.01) | |

(52) U.S. Cl.
CPC ... *H04B 10/5161* (2013.01); *H04L 25/03834* (2013.01); *H04L 25/4927* (2013.01); *H04L 27/366* (2013.01); *H04B 10/541* (2013.01); *H04B 10/556* (2013.01)

(58) Field of Classification Search
CPC ............................ H04L 1/0041; H04L 1/0009; H04L 27/3405; H04L 1/0002; H04B 10/5161; H04B 10/516; H04B 10/541; H04B 10/5561; H04B 10/532; H04B 10/54; H04J 14/02; H04J 14/0232
USPC .................................................. 398/182–191
See application file for complete search history.

(56) References Cited

U.S. PATENT DOCUMENTS

| | | | | |
|---|---|---|---|---|
| 2002/0196510 A1* | 12/2002 | Hietala | ................... | H04L 1/004 398/202 |
| 2013/0216221 A1* | 8/2013 | Zhang | ................... | H04L 1/0057 398/43 |
| 2014/0099108 A1* | 4/2014 | Yu | .......................... | H04B 10/64 398/48 |

(Continued)

OTHER PUBLICATIONS

Yankov et al; Constellation Shaping for fiber-optic channels with QAM and high spectral efficiency; Dec. 2014; IEEE; pp. 2407-2410 (Year: 2014).*

(Continued)

*Primary Examiner* — Amritbir K Sandhu
(74) *Attorney, Agent, or Firm* — Perkins Coie LLP

(57) ABSTRACT

A method of generating a probabilistically shaped (PS), multi-level modulation signals includes encoding information bits into coded bits to which probability values are assigned according to a probability mass function, and mapping, based on a Gray coding scheme, the coded bits into symbols to which the probability values are assigned. The probability mass function is implemented by determining probabilities of the coded bits so that the probabilities of the coded bits in ascending or descending order have a Gaussian distribution, and performing a probability distribution pre-adjustment by redistributing probabilities of the coded bits corresponding to symbols probabilities of which are outside Gaussian distribution so that the symbols mapped based on the Gray coding scheme have the Gaussian distribution.

16 Claims, 13 Drawing Sheets

(56) References Cited

U.S. PATENT DOCUMENTS

2015/0058702 A1* 2/2015 Ramamoorthy .... G06F 11/1068
714/773
2019/0052388 A1* 2/2019 Yu ........................... H04J 14/02

OTHER PUBLICATIONS

Fehenberger et al; Information rates of problematically shaped coded modulation for a multi-span fiber-optic communication system with 64 QAM; Jul. 2017; Optics communication. (Year: 2017).*

Fehenberger et al; On probabilistic shaping of quadrature amplitude modulation for the non linear fiber channel; Journal of light wave technology; Nov. 2016; pp. 5063-5073. (Year: 2016).*

Yankov et al; Constellation Shaping for Fiber-optic Channels with QAM and high spectral efficiency; Dec. 2014; IEEE photonics technology letters; pp. 2407-2410 (Year: 2014).*

Fehenberger et al; Information rates of probabilistically shaped coded modulation for a multi-span fiber-optic communication system with 64 QAM ; Jul. 2017; Optics Communications (Year: 2017).*

Chien, H.-C., et al., "400G-over-80km Connections Powered by Probabilistically Shaped PM-256QAM Wavelengths at 34 GBaud," 2017 European Conference on Optical Communication (ECOC), Gothenburg, Sweden, 3 pages, Sep. 2017.

* cited by examiner

PROBABILISTICALLY SHAPED MULTI-LEVEL PULSE MODULATION WITH GRAY CODE MAPPING

TECHNICAL FIELD

This document relates to optical communication systems.

BACKGROUND

In an optical communication, it is of high practical importance to increase the spectral efficiency. the spectral efficiency can be improved by signal shaping techniques such as probabilistic shaping. In probabilistic shaping, the constellation of symbols is on a uniform grid with differing probabilities per constellation point. The motivation of probabilistic shaping is to generate a signal constellation having a Gaussian distribution that matches that of noise so that the overall information entropy can be maximized.

SUMMARY

The present document discloses, among other things, techniques for improving the spectral efficiency of optical systems by using probabilistic shaping in the multi-level optical signal modulation. Various implementations of the present document allow a probabilistic shaping encoder that is based on a binary coding scheme to be used in a signal modulation with a symbol mapping that is based on a Gray coding scheme, thereby improving the overall performance of optical systems even without using complex Gray-coding-based encoders.

In one example aspect, a method of generating a probabilistically shaped (PS), multi-level modulation signals includes encoding information bits into coded bits to which probability values are assigned according to a probability mass function and mapping, based on a Gray coding scheme, the coded bits into symbols to which the probability values are assigned. The probability mass function is implemented by determining probabilities of the coded bits so that the probabilities of the coded bits in ascending or descending order have a Gaussian distribution, and by performing a probability distribution pre-adjustment by redistributing probabilities of the coded bits corresponding to symbols probabilities of which are outside Gaussian distribution so that the symbols mapped based on the Gray coding scheme have the Gaussian distribution.

In another example aspect, a signal transmitter apparatus includes an encoder including a probabilistic constellation shaping encoder that encodes information bits into coded bits to which probability values are assigned according to a probability mass function, and a symbol mapper that maps, based on a Gray coding, the coded bits into symbols to which the probability values are assigned. A probability distribution after encoding the information bits into the coded bits does not have a Gaussian distribution feature if the symbol mapping of the coded bit is performed based on a binary coding scheme, and has a Gaussian distribution feature if the symbol mapping of the coded bit is performed based on a Gary coding scheme.

In another example aspect, an optical transmitter apparatus includes a light source that generates a light wave as an optical carrier wave, an encoder that encodes information bits to be transferred in a form of an optical multi-level quadrature amplitude modulation (QAM) signal using a probabilistic shaping scheme, and a symbol mapper that assigns the coded information bits to symbols. the encoder includes a probabilistic constellation shaping encoder that encodes information bits into coded bits to which probability values are assigned according to a probability mass function, and the symbol mapper maps, based on a Gray coding, the coded information bits into the symbols to which the probability values are assigned.

These and other aspects, and their implementations and variations are set forth in the drawings, the description and the claims.

DETAILED DESCRIPTION

With the increasing demand for high data communication bandwidth, multi-level optical signal modulation has gained attention in recent years. Pulse-Amplitude Modulation (PAM) is a form of signal modulation where information is encoded in the amplitude of a series of signal pulse such as an optical wave, and Quadrature Amplitude Modulation (QAM) is another form of signal modulation where two carriers such as optical wave shifted in phase by 90 degrees are modulated and the output signal consists of both amplitude and phase variations.

Probabilistic shaping is a method of altering the distribution of signal points across the constellation space by varying the individual probability of occurrence of the signal points. Such a nonuniform distribution as the probabilistic shaping can provide better noise tolerance and higher transmission capacity for optical fiber communication systems by generating a signal constellation having a Gaussian distribution.

Figure 1:
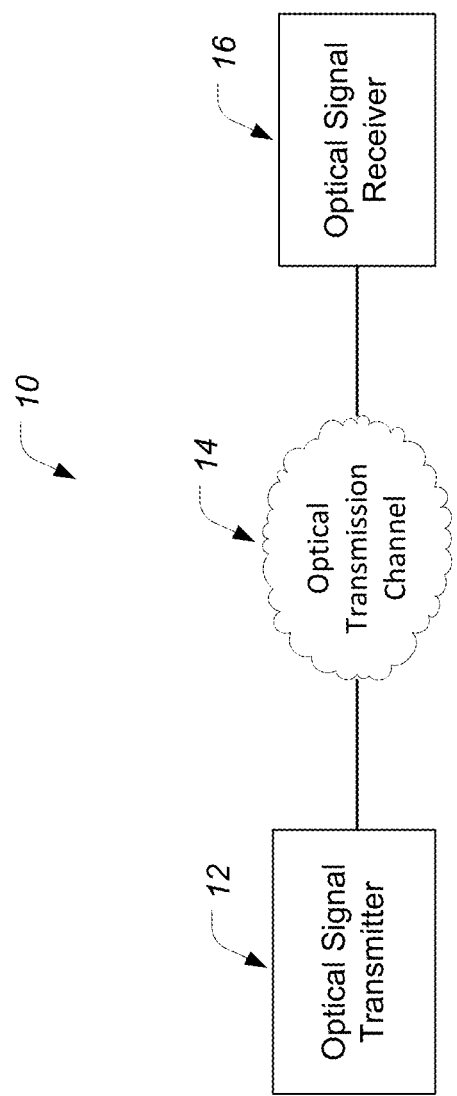
FIG. 1 illustrates an example optical communication network.

FIG. 1 illustrates an example optical communication network 10 in which an optical signal transmitter 12 and an optical signal receiver 16 communicate with each other via an optical transmission channel 14. The optical signal transmitter 12 may include circuitry configured to convert electrical input signals to optical signals. The optical transmission channel 14 may include optical fibers that extend in length from several hundred feet (e.g., last mile drop) to several thousands of kilometers (e.g., long haul networks). The optical signals that have passed the optical transmission channel 14 may be transmitted through intermediate optical equipment such as amplifiers, repeaters, switches, etc., which are not shown in FIG. 1 for clarity. The optical signal receiver 16 may include circuitry configured to perform the actual reception of the optical signals and convert the optical signals into electrical signals.

In some implementations, the optical signal transmitter 12 may include a symbol mapper to generate probabilistically shaped (PS), multi-level PAM or QAM optical signals based on Gaussian distribution, and the optical signal receiver 16 may include a demapper that extracts signals mapped to the PS multi-level PAM or QAM signals based on Gaussian distribution. Here, the PS multi-level optical signals may be generated based on PS multi-level electrical signals generated using, e.g., a built-in function from a Matlab programming.

Figure 2:
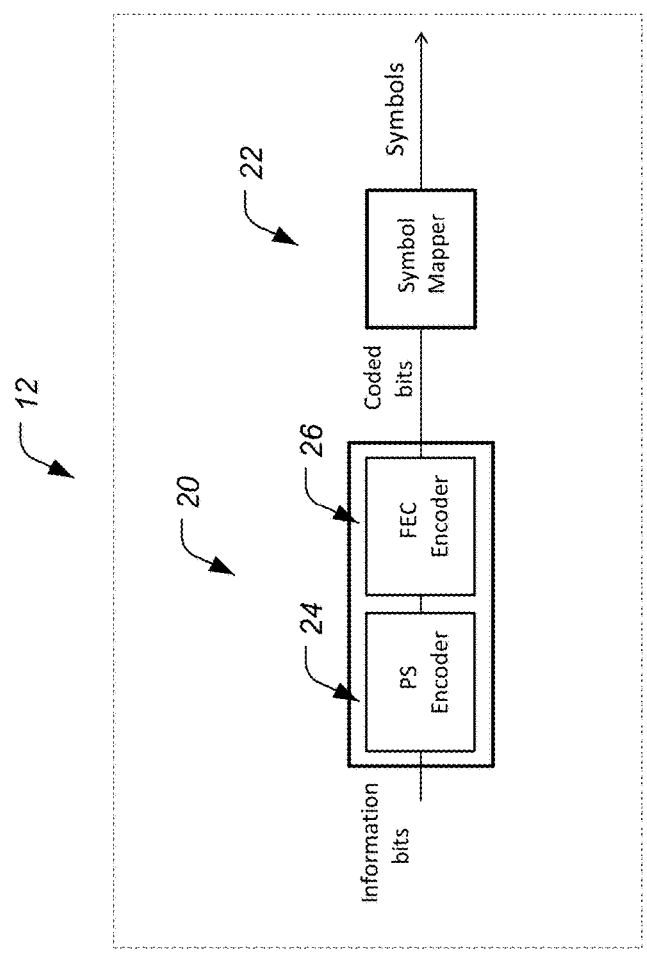
FIG. 2 illustrates an encoder and a symbol mapper implemented in a transmitter.

FIG. 2 illustrates an example optical signal transmitter 12 in which a light wave is modulated by electrical PS multi-level modulation signals. In an implementation, the optical signal transmitter 12 includes an encoder 20 and a symbol mapper 22. The encoder 20 may include a PS encoder 24 that encodes data to be transmitted via the optical transmission channel 14. The encoder 20 may also include a forward error correction (FEC) encoder 26 to add redundancy to the data to be transmitted so that the optical signal receiver 16 can detect and correct errors in the data received from the optical signal transmitter 12. In an implementation of the disclosed technology, a coding of data bits is performed, followed by a symbol mapping that maps coded bits to symbols. In the coding process, actual probabilities for the symbols are unknown, and thus coded bits are generated based on the probabilities estimated according to a given probability mass function (PMF).

Figure 3:
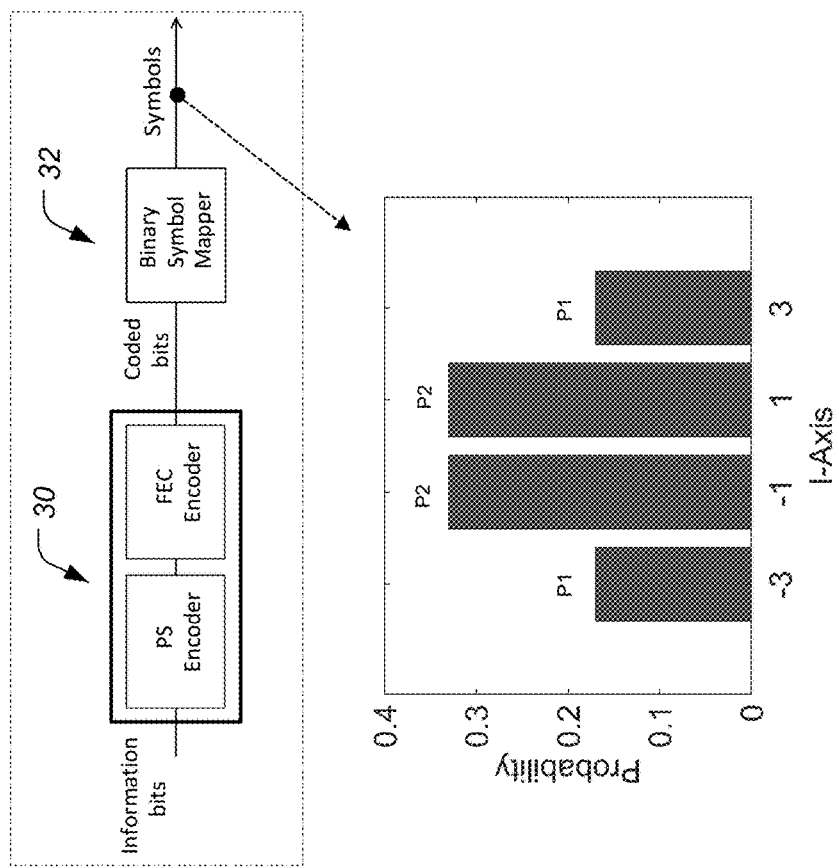
FIG. 3 illustrates probabilities of symbols mapped according to a probability mass function that is based on a binary code mapping scheme.

FIG. 3 illustrates probabilities of symbols mapped according to a probability mass function that is based on a binary code mapping scheme. An encoder 30, which includes the PS encoder and the FEC encoder, generates coded bits according to a given probability mass function (PMF). The PMF is a function that maps possible outcomes of a random variable to the corresponding probabilities. Here, PMF describes the desired probabilities of symbols on I-axis and Q-axis. PMF of a typical encoder can be obtained based on the presumption that a binary mapping is used, which means that the encoder 30 assumes that the integers and I/Q symbols are listed in either ascending or descending order for one-to-one mapping purposes. For example, probabilities of 16QAM symbols on the I-axis are shown in Table 1.

TABLE 1

| PMF | | | Symbol Mapping—Binary | |
| --- | --- | --- | --- | --- |
| Data | Probability | I-Axis | Data | I-Axis |
| 0 [00] | P1 | −3 | 0 [00] | −3 |
| 1 [01] | P2 | −1 | 1 [01] | −1 |
| 2 [10] | P2 | +1 | 2 [10] | +1 |
| 3 [11] | P1 | +3 | 3 [11] | +3 |

In Table 1, a binary m-QAM symbol mapping is used for the coded bits, and output probabilities are distributed in the same way as the binary symbol mapping. The symbols on the I-axis are listed in the ascending order, and the probabilities are distributed based on the presumption that the symbols on the I-axis are listed in the ascending order. Thus, as can be seen in FIG. 3, the probability distribution shows Gaussian features.

Figure 4:
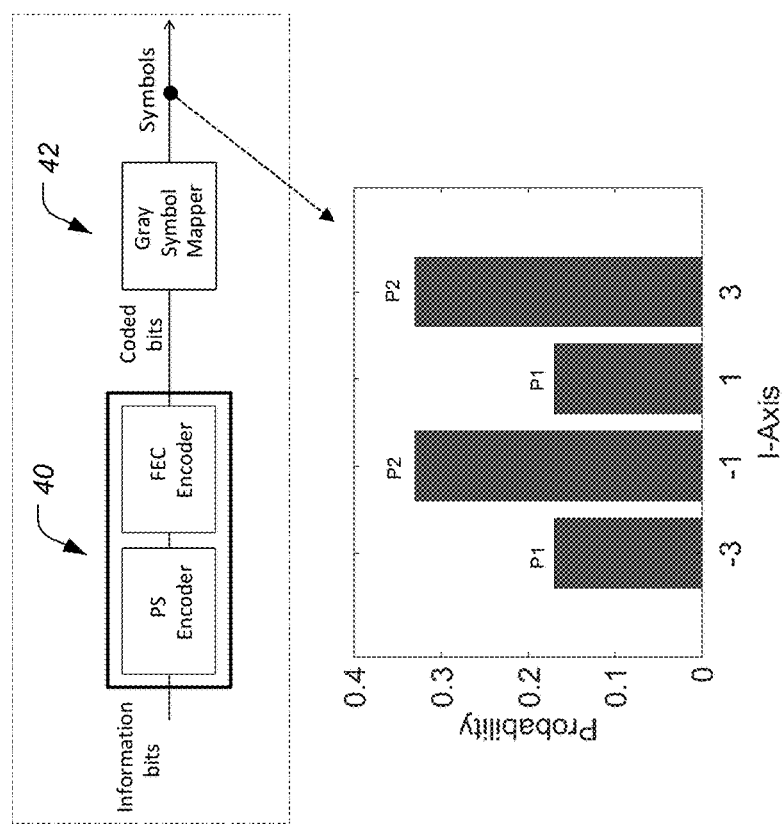
FIG. 4 illustrates probabilities of symbols mapped according to a probability mass function that is based on a Gray code mapping scheme.

FIG. 4 illustrates probabilities of symbols mapped according to a probability mass function that is based on a Gray code mapping scheme. when a subsequent Gray symbol mapping is employed, the output probability distribution is not Gaussian because the integers are no longer listed in ascending or descending order, and the corresponding probability on the I-Axis does not reflect the changes in the probability distribution. As a result, the probability distribution does not show Gaussian features. For example, probabilities of 16QAM symbols on the I-axis are shown in Table 2 (italicized emphasis added to integers that do not have desired probabilities).

TABLE 2

| PMF | | | Symbol Mapping—Gray | |
| --- | --- | --- | --- | --- |
| Data | Probability | I-Axis | Data | I-Axis |
| 0 [00] | P1 | −3 | 0 [00] | −3 |
| 1 [01] | P2 | −1 | 1 [01] | −1 |
| 2 [10] | P2 | +1 | 3 [11] | +1 |
| 3 [11] | P1 | +3 | 2 [10] | +3 |

Figure 5:
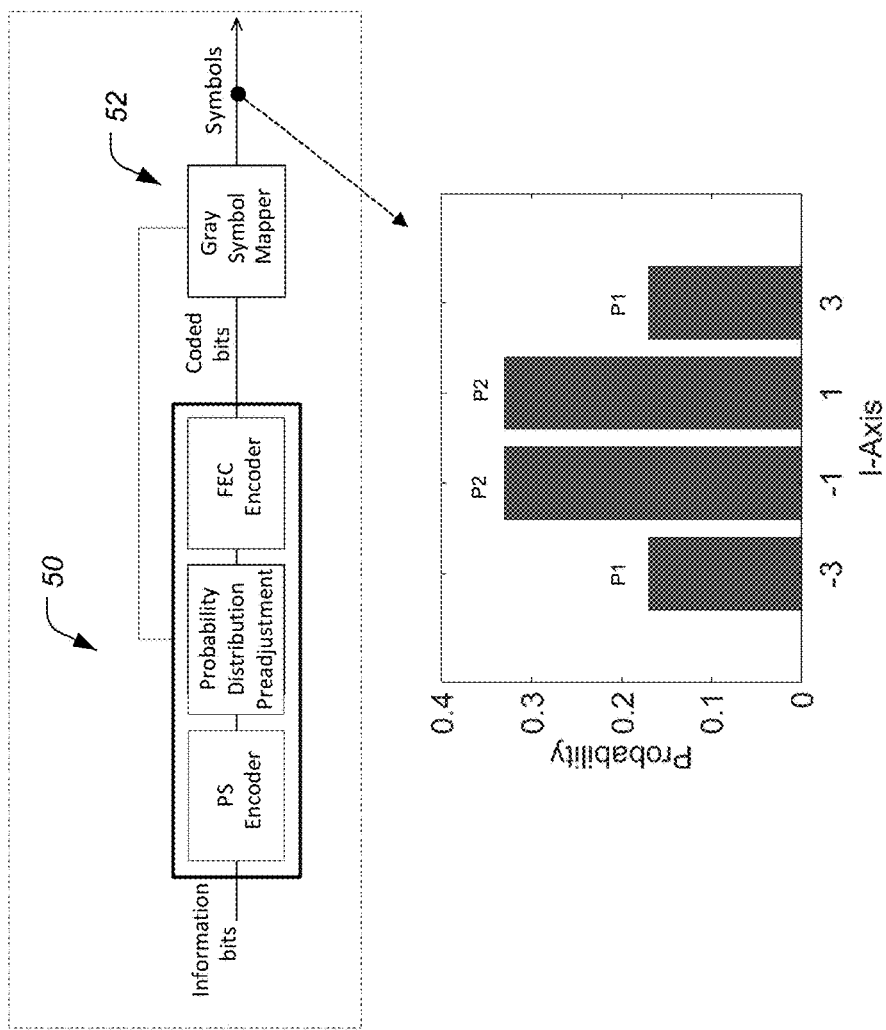
FIG. 5 illustrates probabilities of symbols mapped according to a probability mass function that is based on a Gray code mapping scheme and reflecting the changes in the output symbol probability distribution.

FIG. 5 illustrates probabilities of symbols mapped according to a probability mass function that is based on a Gray code mapping scheme and reflecting the changes in the output symbol probability distribution. In an implementation of the disclosed technology, the probabilities are distributed so that the probability distribution after the subsequent Gray mapping has Gaussian features. For example, probabilities are determined and redistributed in the following way. First, probabilities of integers are distributed in ascending (or descending) order in the PMF. Secondly, the coded bits are mapped based on Gray coding, and Gray-mapped symbols are output. Here, the Gray-mapped symbols do not have a Gaussian probability distribution. Subsequently, the probabilities of integers are traced back to those in the PMF to compare actual probabilities with desired probabilities and modify the probability distribution.

The encoder 50 based on an implementation of the disclosed technology may include a functional module for performing a probability distribution pre-adjustment. This functional module compares actual probabilities at the output port of the Gray symbol mapper 52 with probabilities in the PMF and modify the probability distribution in the PMF as shown in Table 3 (emphasis added to redistributed probabilities).

TABLE 3

| PMF | | | Symbol Mapping—Gray | |
| --- | --- | --- | --- | --- |
| Data | Probability | I-Axis | Data | I-Axis |
| 0 [00] | P1 | −3 | 0 [00] | −3 |
| 1 [01] | P2 | −1 | 1 [01] | −1 |
| 2 [10] | P1 | +1 | 3 [11] | +1 |
| 3 [11] | P2 | +3 | 2 [10] | +3 |

Referring to FIG. 5, a method of optical transmission based on the disclosed technology may include probabilistically shaping information bits into probabilistically shaped (PS) bits, performing probability distribution pre-adjustment on the PS bits to produce preadjusted bits, forward error correcting the preadjusted bits to produce coded bits, and mapping the coded bits to symbols using a gray symbol mapper. The pre-adjustment is performed such that output symbols of the gray symbol mapper conform to a Gaussian probability distribution.

Figure 6:
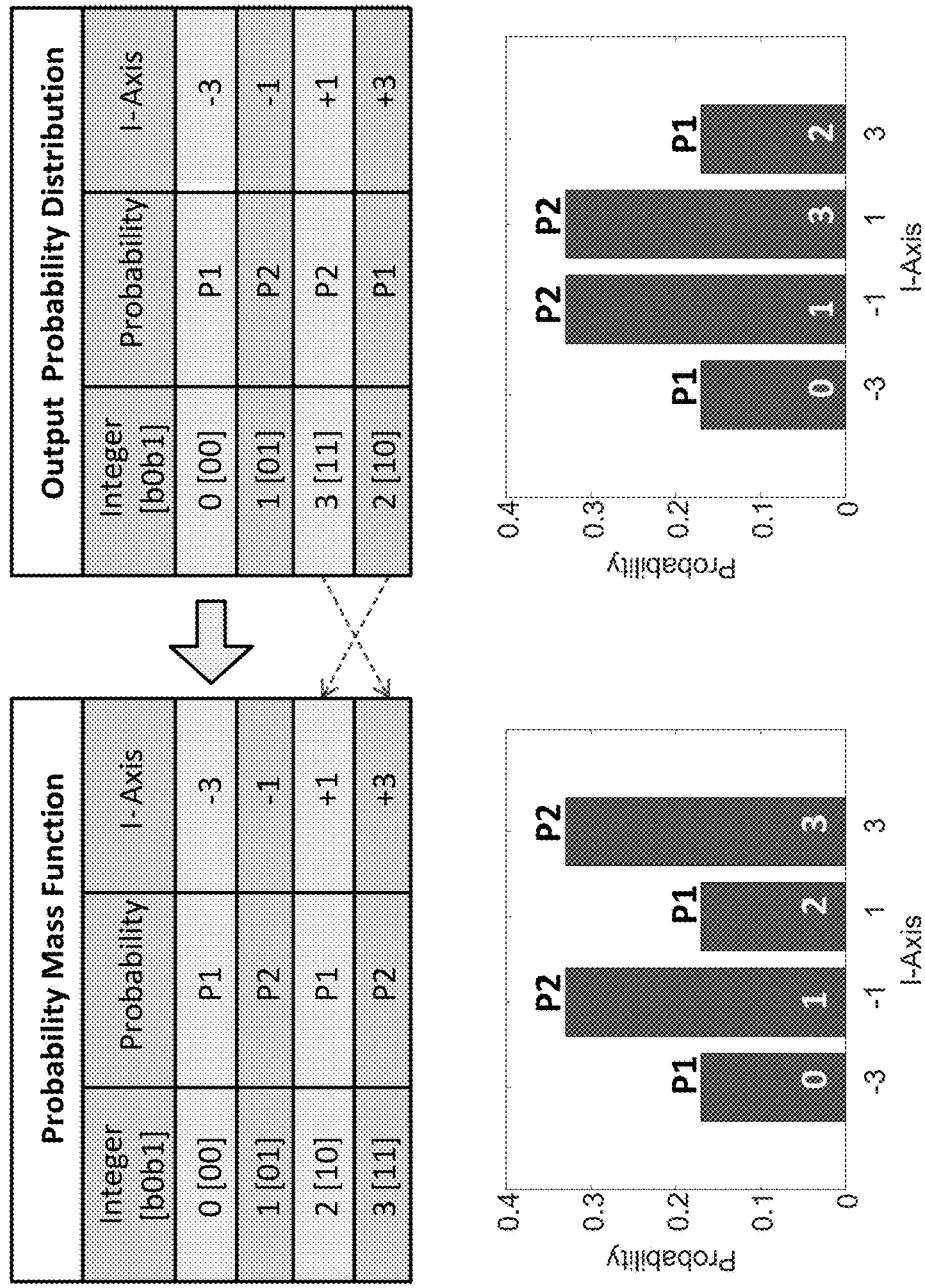
FIG. 6 illustrates tables and probability diagrams of 16QAM showing a process of performing probability distribution pre-adjustment based on the disclosed technology.

FIG. 6 illustrates tables and probability diagrams of 16QAM showing how to perform probability distribution pre-adjustment based on the disclosed technology. In 16QAM, the probability distribution pre-adjustment may be implemented by switching the probability originally assigned to integer 2 with the probability originally assigned to integer 3 so that the probability distribution after the subsequent Gray mapping has Gaussian features. As a result, in the PMF the probability P1 is assigned to integer 2 and the probability P2 is assigned to integer 3.

Figure 7:
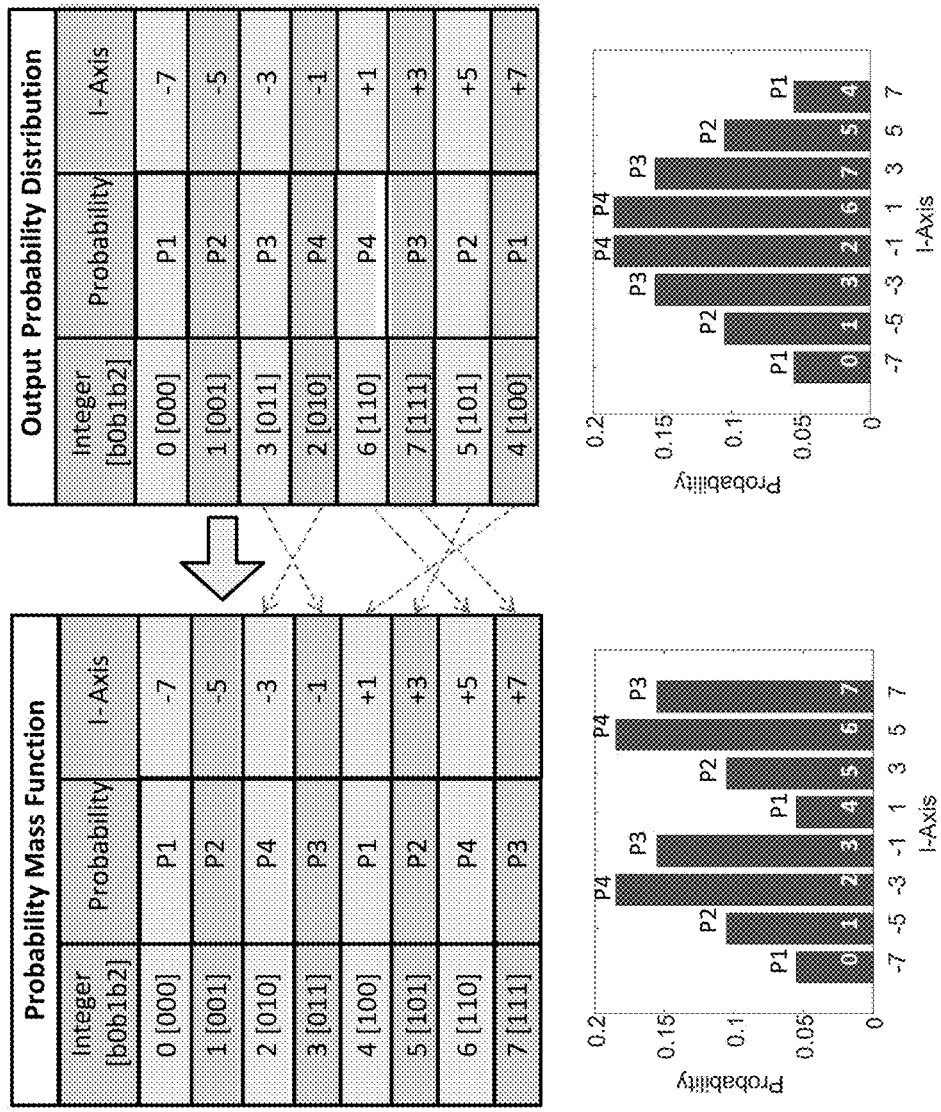
FIG. 7 illustrates tables and probability diagrams of 64QAM showing a process of performing probability distribution pre-adjustment based on the disclosed technology.

FIG. 7 illustrates tables and probability diagrams of 64QAM showing how to perform probability distribution pre-adjustment based on the disclosed technology. In 64QAM, the probability distribution pre-adjustment may be implemented by switching the probabilities of integers in PMF so that the probability distribution after the subsequent Gray mapping has Gaussian features. The probability P3 originally assigned to integer 2 is switched with the probability P4 originally assigned to integer 3. The probability P4 originally assigned to integer 4 is switched with the probability P1 originally assigned to integer 7. The probability P3 originally assigned to integer 5 with the probability P2 originally assigned to integer 6. The probability P2 originally assigned to integer 6 with the probability P4 originally assigned to integer 4. The probability P1 originally assigned to integer 7 with the probability P3 originally assigned to integer 5.

Figure 8A:
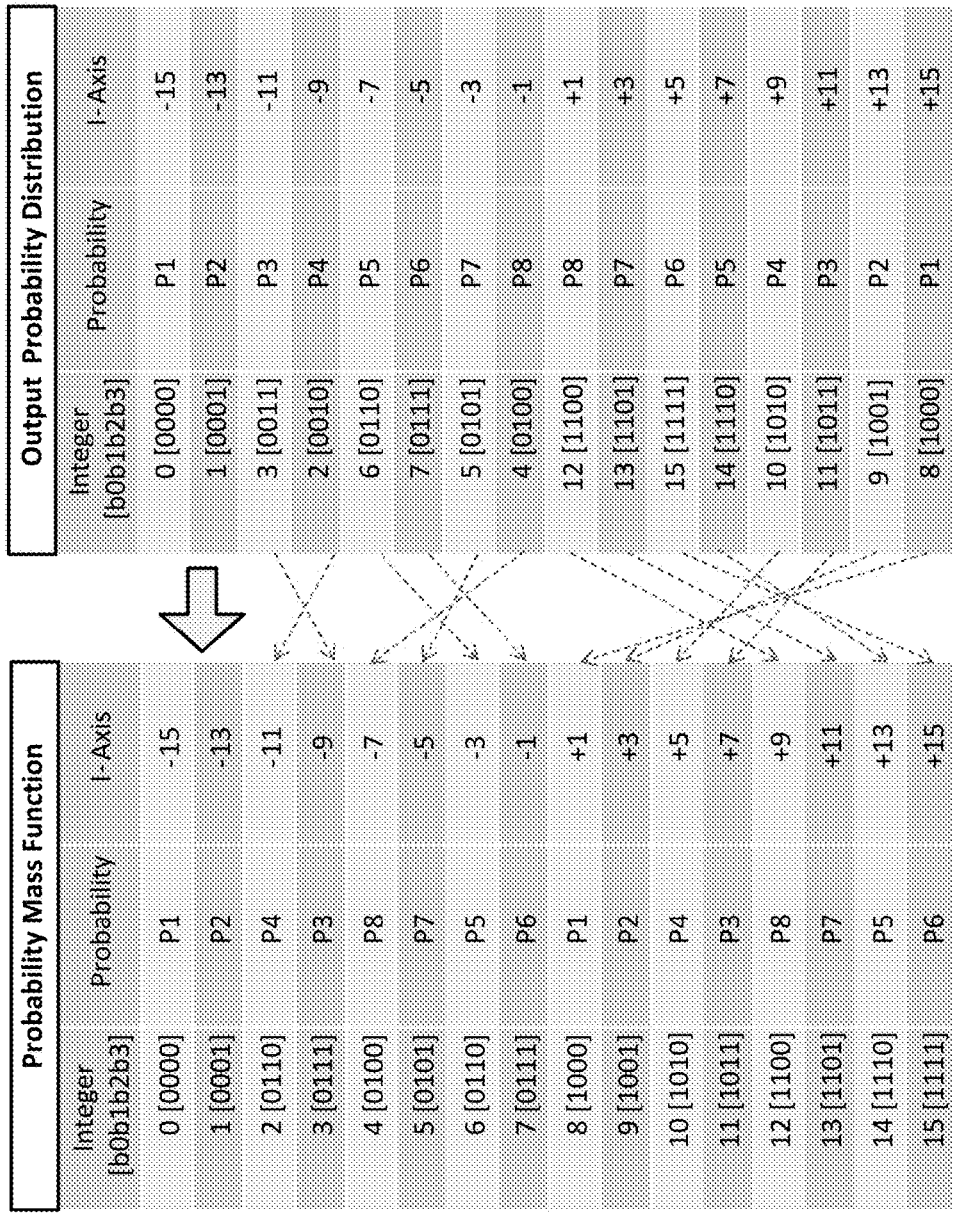
FIGS. 8A and 8B illustrate tables and probability diagrams of 256QAM showing a process of performing probability distribution pre-adjustment based on the disclosed technology.
Figure 8B:
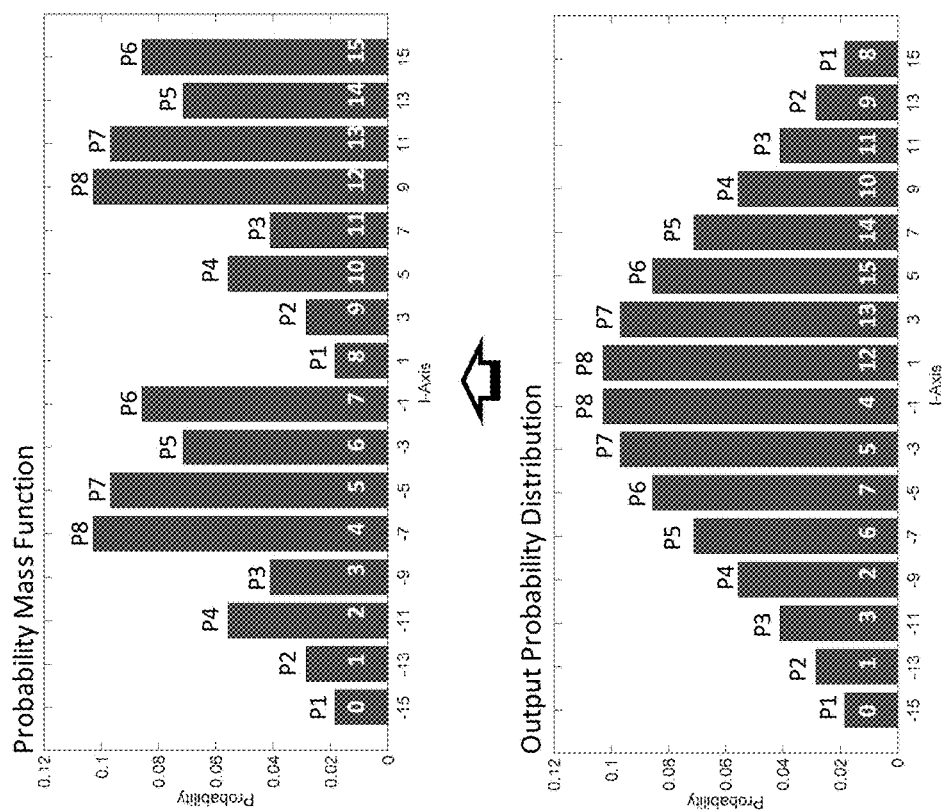

FIGS. 8A and 8B illustrate tables and probability diagrams of 256QAM showing how to perform probability distribution pre-adjustment based on the disclosed technology. In 256QAM, the probability distribution pre-adjustment may be implemented by switching the probabilities of integers in PMF so that the probability distribution after the subsequent Gray mapping has Gaussian features. The probability P3 originally assigned to integer 2 is switched with the probability P4 originally assigned to integer 3. The probability P5 originally assigned to integer 4 is switched with the probability P8 originally assigned to integer 7. The probability P6 originally assigned to integer 5 with the probability P7 originally assigned to integer 6. The probability P7 originally assigned to integer 6 with the probability P5 originally assigned to integer 4. The probability P8 originally assigned to integer 7 with the probability P6 originally assigned to integer 5. The probability P8 originally assigned to integer 8 is switched with the probability P1 originally assigned to integer 15. The probability P7 originally assigned to integer 9 with the probability P2 originally assigned to integer 14. The probability P6 originally assigned to integer 10 with the probability P4 originally assigned to integer 12. The probability P5 originally assigned to integer 11 with the probability P3 originally assigned to integer 13. The probability P4 originally assigned to integer 12 is switched with the probability P8 originally assigned to integer 8. The probability P3 originally assigned to integer 13 with the probability P7 originally assigned to integer 9. The probability P2 originally assigned to integer 14 with the probability P5 originally assigned to integer 11. The probability P1 originally assigned to integer 15 with the probability P6 originally assigned to integer 10.

Figure 9B:
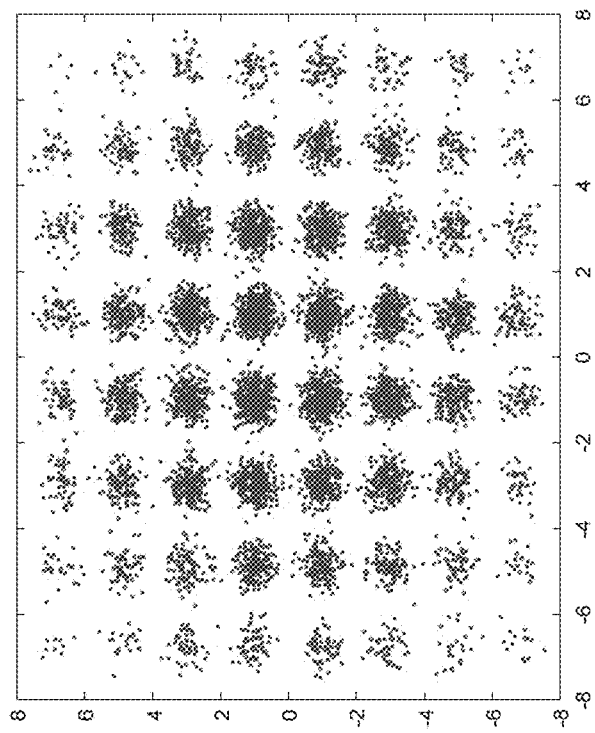
FIG. 9B illustrates a corresponding example constellation of Gray-coded PS 64QAM at 28-dB OSNR.
Figure 9A:
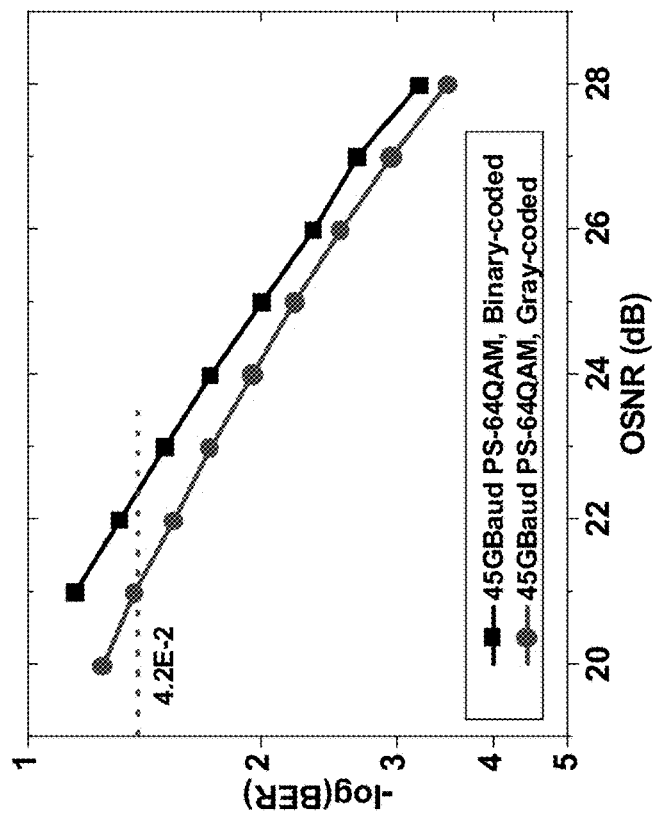
FIG. 9A illustrates BER as function of optical signal to noise ratio (OSNR) for binary-coded symbol mapping and Gray-coded symbol mapping.

FIG. 9A illustrates BER as function of optical signal to noise ratio (OSNR) for binary-coded symbol mapping and Gray-coded symbol mapping, and FIG. 9B illustrates a corresponding example constellation of Gray-coded PS 64QAM at 28-dB OSNR. As can be seen here, a Gray-coded PS signal exhibits 1.5 dB OSNR improvement over the traditional binary-coded PS signal.

Figure 10:
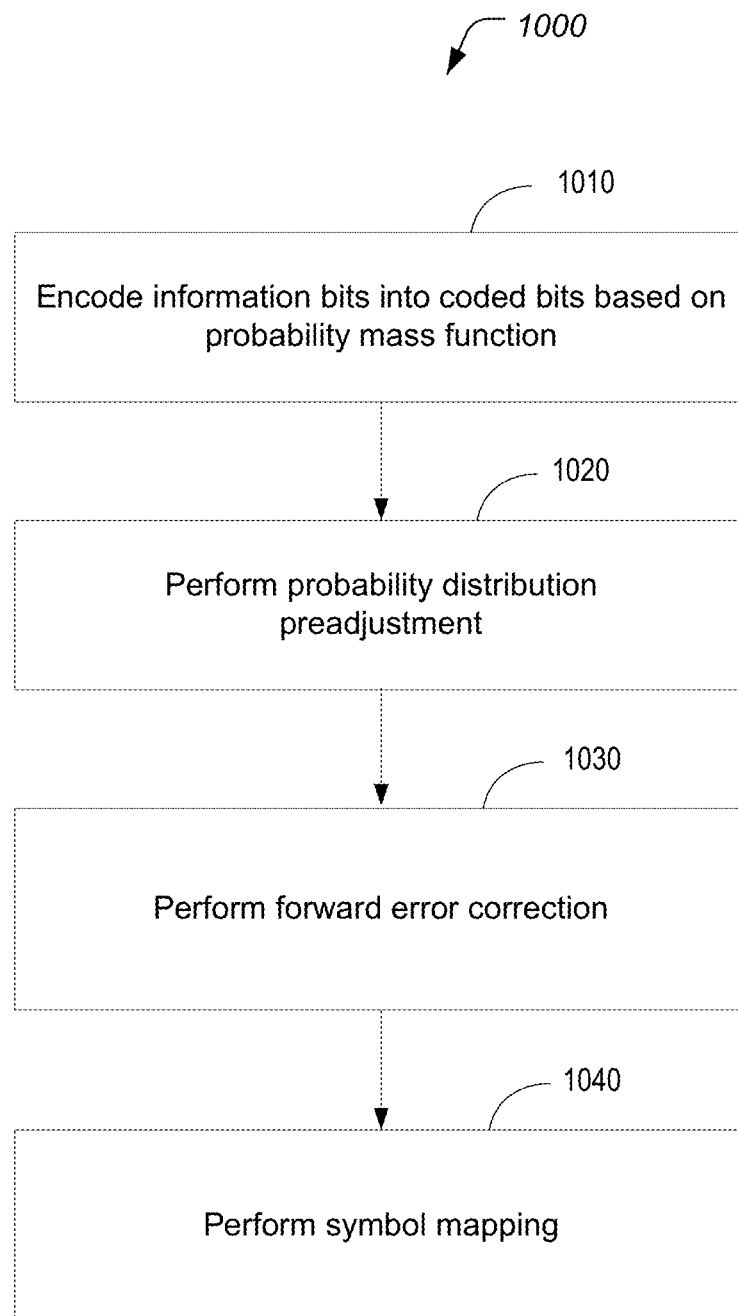
FIG. 10 is a flow chart representation of an example signal modulation method.

FIG. 10 is a flow chart representation of an example signal modulation method 1000. At step 1010, an encoder encodes information bits into coded bits based on a given probability mass function (PMF). In an implementation of the disclosed technology, PMF can be obtained based on the presumption that a binary code mapping scheme is used, which means that, when a symbol mapping is performed, it is assumed that the integers and I/Q symbols are listed in either ascending or descending order for purposes of one-to-one mapping between probabilities and the information bits. Thus, probabilities of the coded information bits are distributed such that the symbols mapped based on the binary mapping scheme have Gaussian features. At step 1020, the encoder performs probability distribution pre-adjustment. In an implementation, the symbol mapping is performed based on a Gray code mapping scheme. Because the probabilities of the symbols are distributed based on the presumption that the binary mapping scheme is used, therefore, probabilities of actual symbols mapped based on the Gray coding scheme do not have Gaussian features. At step 1030, an additional signal processing such as a forward error correction may be performed on the coded bits. At step 1040, the coded information bits are mapped into the symbols based on a Gray code mapping scheme.

Figure 11:
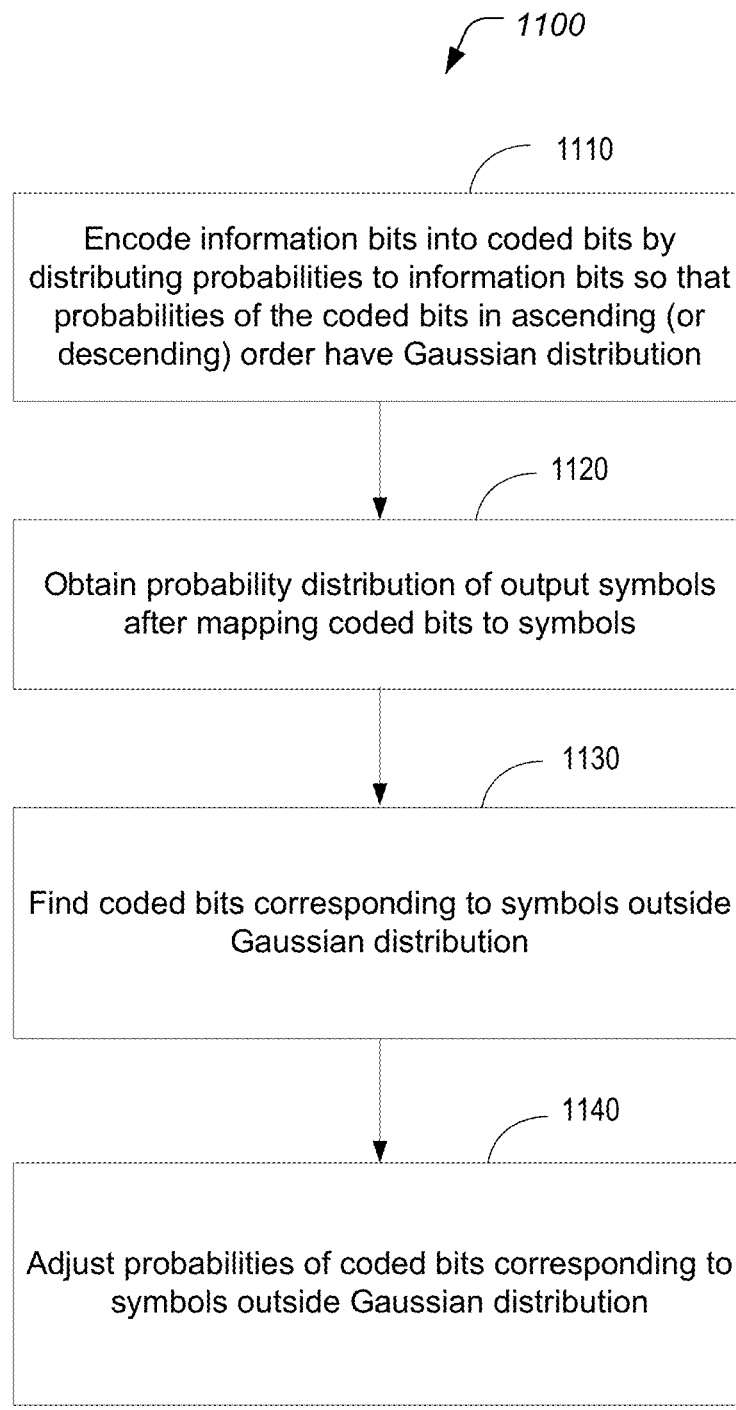
FIG. 11 is a flow chart representation of an example probability distribution pre-adjustment method.

FIG. 11 is a flow chart representation of an example probability distribution pre-adjustment method 1100. At step 1110, information bits to be transmitted to a receiver are encoded into coded information bits by distributing probabilities to information bits so that probabilities of the coded information bits in ascending (or descending) order have Gaussian distribution. Subsequently, the coded information bits are mapped into symbols to which the probability values are assigned based on a Gray coding scheme. Thus, symbols mapped from the coded information bits do not have Gaussian features. At the step 1120, a probability distribution of mapped symbols is obtained after mapping the coded information bits to the symbols. At step 1130, the probability distribution of symbols mapped based on the Gray coding scheme is compared with a target Gaussian probability distribution of symbols to find coded information bits corresponding to symbols outside the target Gaussian probability distribution. At step 1140, probabilities of the coded information bits corresponding to the symbols outside the target Gaussian probability distribution are adjusted so that the symbols mapped based on the Gray coding scheme have the Gaussian distribution.

In order to perform the probability distribution pre-adjustment, the probability distribution of the symbols is obtained at least once after mapping the coded bits, which are encoded based on the binary coding scheme, to the symbols, which are mapped based on the Gray coding scheme. As a result, some symbols may be outside Gaussian distribution, and information bits corresponding to those symbols outside Gaussian distribution can be found by comparing with a target Gaussian probability distribution of symbols. Probabilities of those information bits corresponding to the symbols outside Gaussian distribution are adjusted so that the symbols mapped based on the Gray coding scheme have the Gaussian distribution.

Figure 12:
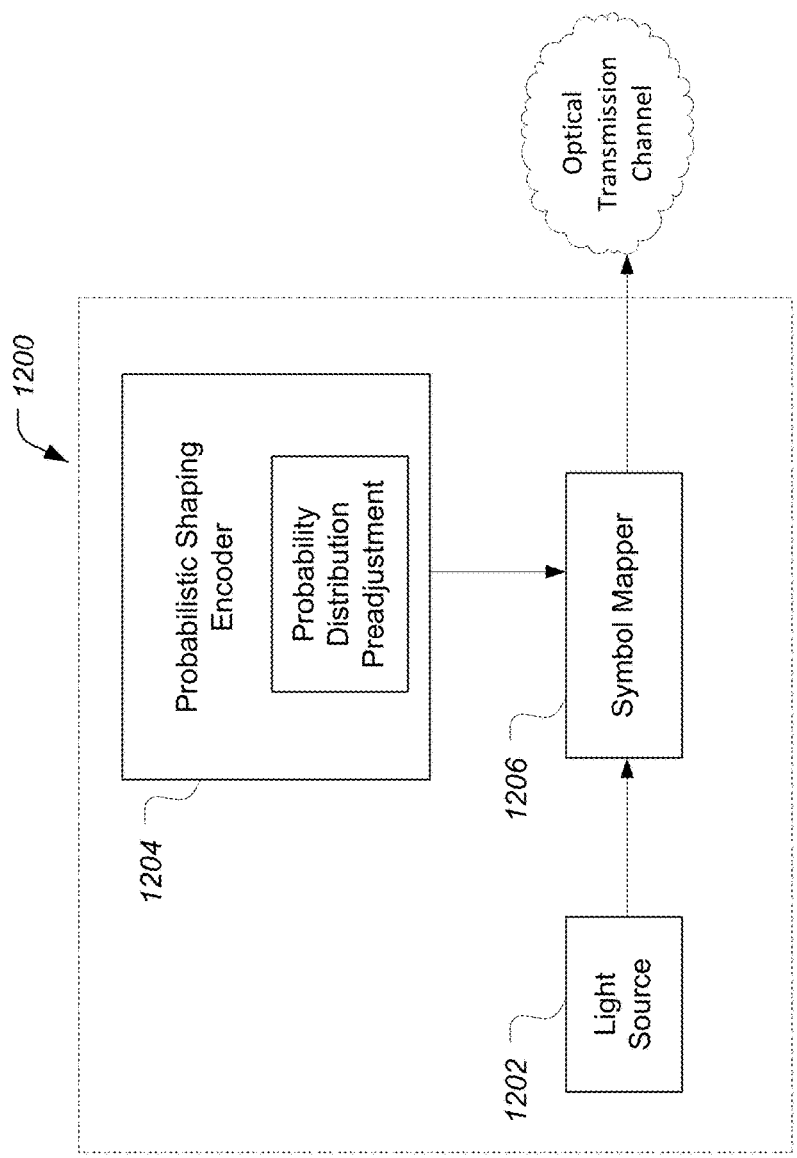
FIG. 12 illustrates an example optical signal transmitter.

FIG. 12 illustrates an example optical signal transmitter 1200 implemented based on the disclosed technology. In an implementation, the optical signal transmitter 1200 includes a light source 1202, a probabilistic shaping encoder 1204, and a symbol mapper 1206. The light source 1202 produces a light wave to be used as an optical carrier. In an implementation, the light wave is modulated by electrical probabilistically shaped multi-level QAM signal. For example, a continuous wave light generated at the light source 1202 is modulated and mapped to symbols at the symbol mapper 1206 with information bits encoded at the probabilistic shaping encoder 1204. The probabilistic shaping encoder 1202 encodes information bits to be transferred to an optical receiver in a form of an optical multi-level quadrature amplitude modulation (QAM) signal using a probabilistic shaping scheme. The symbol mapper 1206 assigns the coded information bits to symbols. The probabilistic shaping encoder 1204 encodes information bits into coded bits to which probability values are assigned according to a probability mass function. The symbol mapper 1204 maps, based on a Gray coding, the coded information bits into the symbols to which the probability values are assigned. A probability distribution after encoding the information bits into the coded information bits does not have a Gaussian distribution feature if the symbol mapping of the coded bit is performed based on a binary coding scheme, and has a Gaussian distribution feature if the symbol mapping of the coded bit is performed based on a Gary coding scheme.

The spectral efficiency of optical systems can be improved by using probabilistic shaping in the multi-level QAM or PAM with Gray code symbol mapping scheme. Various implementations of the present document allow a probabilistic shaping encoder that is based on a binary coding scheme to be used in a signal modulation with a symbol mapping that is based on a Gray coding scheme, thereby improving the overall performance of optical systems even without using complex Gray-coding-based encoders.

The disclosed and other embodiments, algorithms, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "signal processing circuit" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

In implementing the equalization algorithm discussed in this document, a computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of generating a probabilistically shaped (PS), multi-level modulation signals, comprising:
    encoding information bits into coded bits to which probability values are assigned according to a probability mass function; and
    mapping, based on a Gray coding scheme, the coded bits into symbols,
    wherein the probability mass function is implemented by:
        determining probabilities of the coded bits so that the probabilities of the coded bits ascending or descending order have a Gaussian distribution; and
        performing a probability distribution pre-adjustment by redistributing probabilities of the coded bits corresponding to symbols probabilities of which are outside Gaussian distribution so that the symbols mapped based on the Gray coding scheme have the Gaussian distribution,
    wherein the performing the probability distribution pre-adjustment includes obtaining at least once the probability distribution of the symbols after mapping the coded bits to the symbols.

2. The method of claim 1, wherein the performing the probability distribution pre-adjustment includes finding probabilities of information bits corresponding to symbols outside Gaussian distribution.

3. The method of claim 2, wherein the performing the probability distribution pre-adjustment includes adjusting probabilities of coded bits corresponding to symbols outside Gaussian distribution.

4. The method of claim 1, wherein the determining probabilities of the coded bits includes determining probability distribution of the symbols mapped based on a binary coding scheme.

5. The method of claim 1, further comprising performing a forward error correction before mapping the coded bits into the symbols.

6. A signal transmitter apparatus, comprising:
    an encoder including a probabilistic constellation shaping encoder that encodes information bits into coded bits to which probability values are assigned according to a probability mass function; and
    a symbol mapper that maps, based on a Gray coding, the coded bits into symbols to which the probability values are assigned,
    wherein a probability distribution after encoding the information bits into the coded bits does not have a Gaussian distribution feature, and has a Gaussian distribution feature the symbol mapping of the coded bit is performed based on a Gary coding scheme,
    wherein the probability mass function is performed by:
        determining probabilities of the coded bits so that the probabilities of the coded bits in ascending or descending order have a Gaussian distribution; and
        performing a probability distribution pre-adjustment by redistributing probabilities of the coded bits corresponding to symbols probabilities of which are outside Gaussian distribution so that the symbols mapped based on the Gray coding have the Gaussian distribution,
    wherein the performing the probability distribution pre-adjustment includes obtaining at least once the probability distribution of the symbols after mapping the coded bits to the symbols.

7. The apparatus of claim 6, wherein the performing the probability distribution pre-adjustment includes finding probabilities of information bits corresponding to symbols outside Gaussian distribution.

8. The apparatus of claim 7, wherein the performing the probability distribution pre-adjustment includes adjusting probabilities of coded bits corresponding to symbols outside Gaussian distribution.

9. The apparatus of claim 6, wherein the determining probabilities of the coded bits includes determining probability distribution of the symbols mapped based on a binary coding scheme.

10. The apparatus of claim 6, further comprising a forward error correction encoder that performs a forward error correction before mapping the coded bits into the symbols.

11. An optical transmitter apparatus, comprising:
    a light source that generates a light wave as an optical carrier wave;
    an encoder that encodes information bits to be transferred in a form of an optical multi-level quadrature amplitude modulation (QAM) signal using a probabilistic shaping scheme; and
    a symbol mapper that assigns the coded information bits to symbols,
    wherein the encoder includes a probabilistic constellation shaping encoder that encodes information bits into coded bits to which probability values are assigned according to a probability mass function, and the symbol mapper maps, based on a Gray coding, the coded information bits into the symbols to which the probability values are assigned,
    wherein a probability distribution after encoding the information bits into the coded information bits does not have a Gaussian distribution feature if the symbol mapping of the coded bit is performed based on a binary coding scheme, and has a Gaussian distribution feature if the symbol mapping of the coded bit is performed based on a Gary coding scheme.

12. The apparatus of claim 11, wherein the probability mass function is performed by:
    determining probabilities of the coded bits so that the probabilities of the coded bits in ascending or descending order have a Gaussian distribution; and
    performing a probability distribution pre-adjustment by redistributing probabilities of the coded bits corresponding to symbols probabilities of which are outside Gaussian distribution so that the symbols mapped based on the Gray coding have the Gaussian distribution.

13. The apparatus of claim 12, wherein the performing the probability distribution pre-adjustment includes obtaining at least once the probability distribution of the symbols after mapping the coded bits to the symbols.

14. The apparatus of claim 13, wherein the performing the probability distribution pre-adjustment includes finding probabilities of information bits corresponding to symbols outside Gaussian distribution.

15. The apparatus of claim 14, wherein the performing the probability distribution pre-adjustment includes adjusting probabilities of coded bits corresponding to symbols outside Gaussian distribution.

16. The apparatus of claim 12, wherein the determining probabilities of the coded bits includes determining probability distribution of the symbols mapped based on a binary coding scheme.

* * * * *